July 27, 1926.
H. A. LINTHWAITE
1,593,771
ART OF CONCRETE CONSTRUCTION
Filed Sept. 26, 1922     12 Sheets-Sheet 1
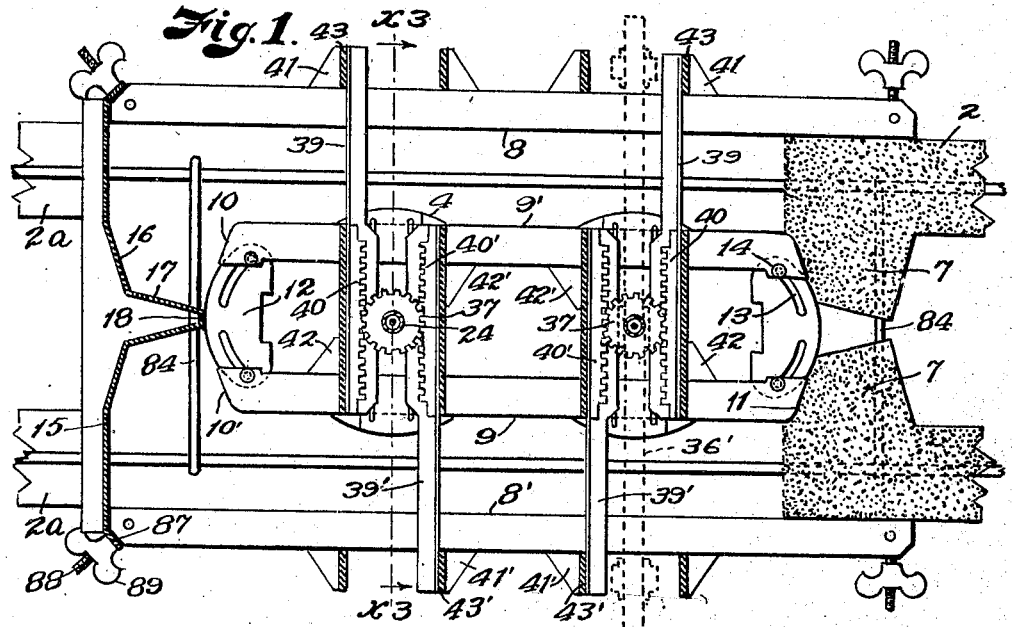
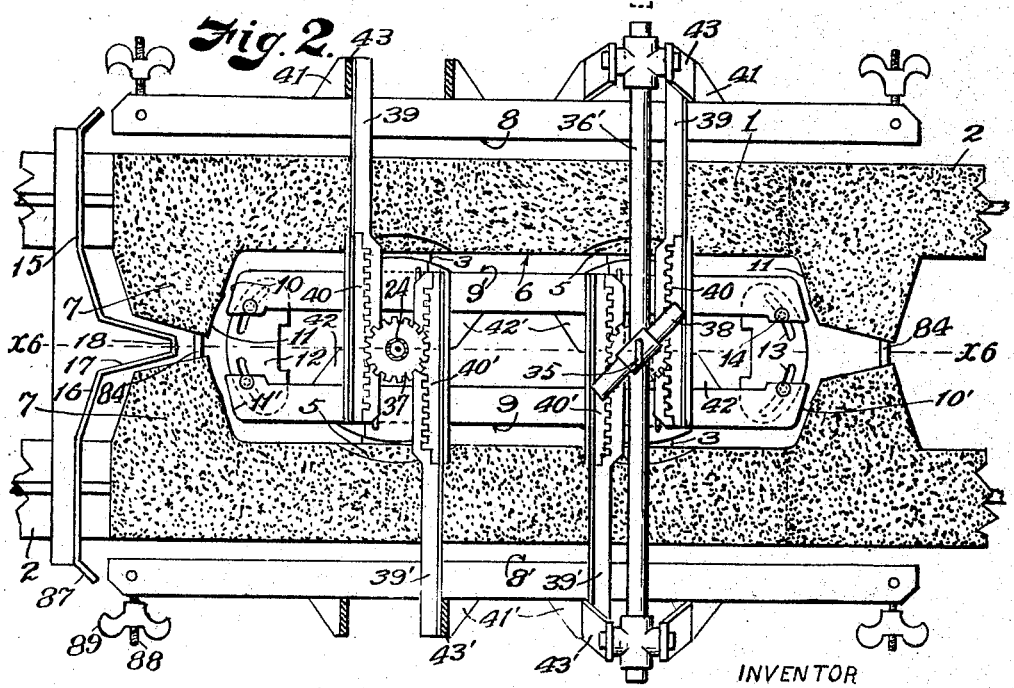
WITNESS
C. C. Holly.
INVENTOR
HERBERT A. LINTHWAITE.
BY James R. Townsend
his ATTORNEY

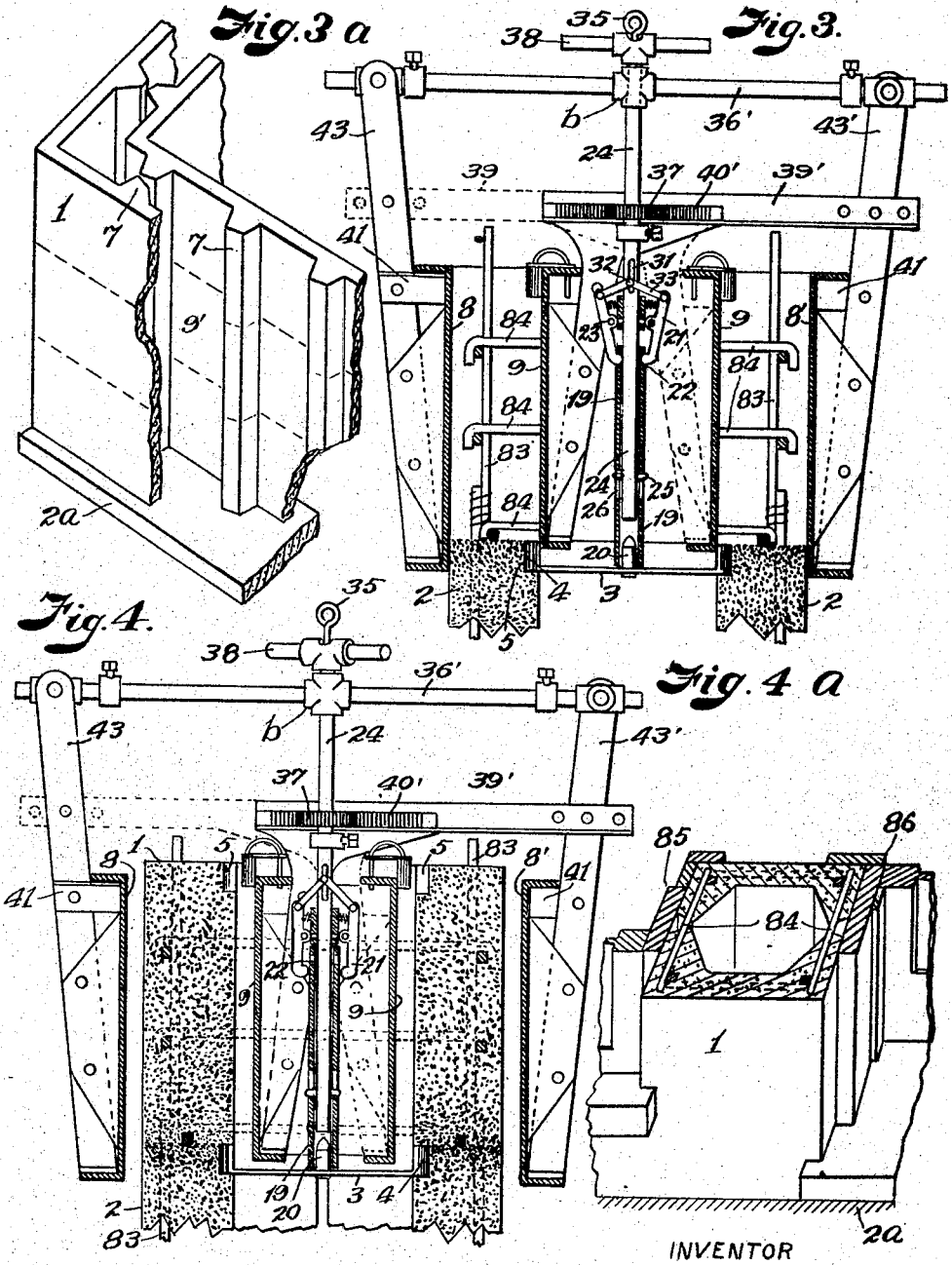

July 27, 1926.
H. A. LINTHWAITE
1,593,771
ART OF CONCRETE CONSTRUCTION
Filed Sept. 26, 1922     12 Sheets-Sheet 3
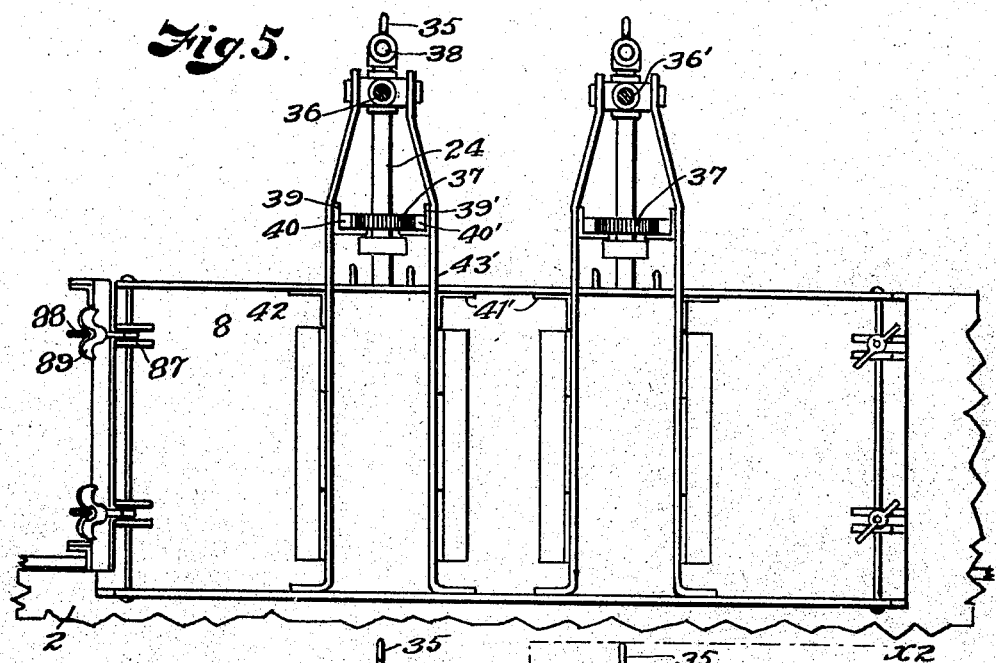
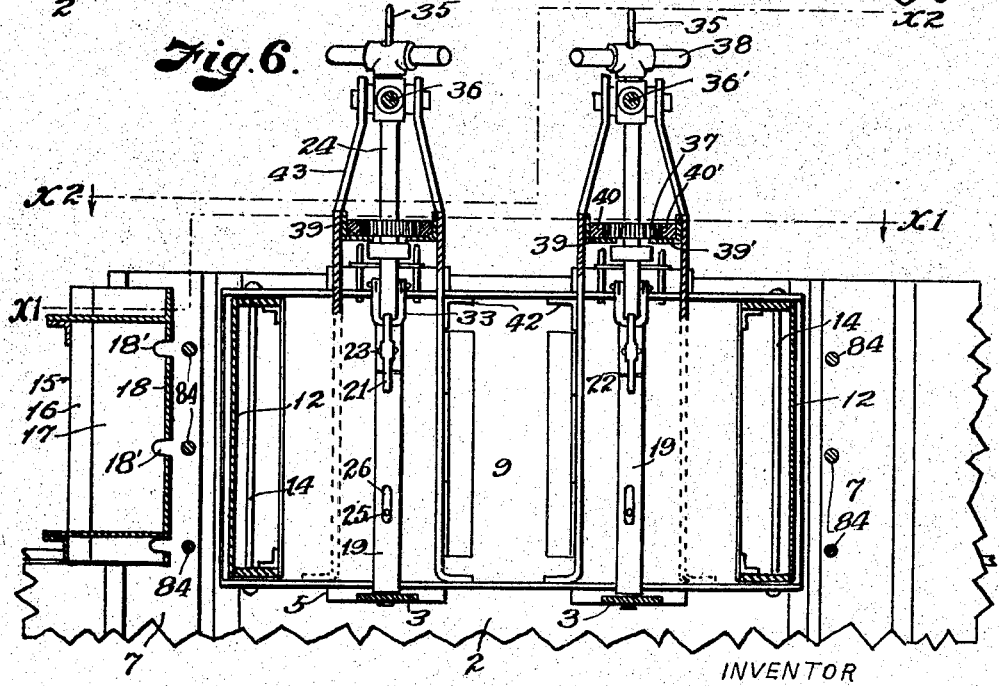
INVENTOR
HERBERT A. LINTHWAITE
BY James R. Townsend
his ATTORNEY
WITNESS
C. C. Holly July 27, 1926.

H. A. LINTHWAITE 1,593,771

ART OF CONCRETE CONSTRUCTION

Filed Sept. 26, 1922    12 Sheets-Sheet 4

WITNESS
E. C. Holly.

INVENTOR
HERBERT A LINTHWAITE
BY James R. Townsend
his ATTORNEY

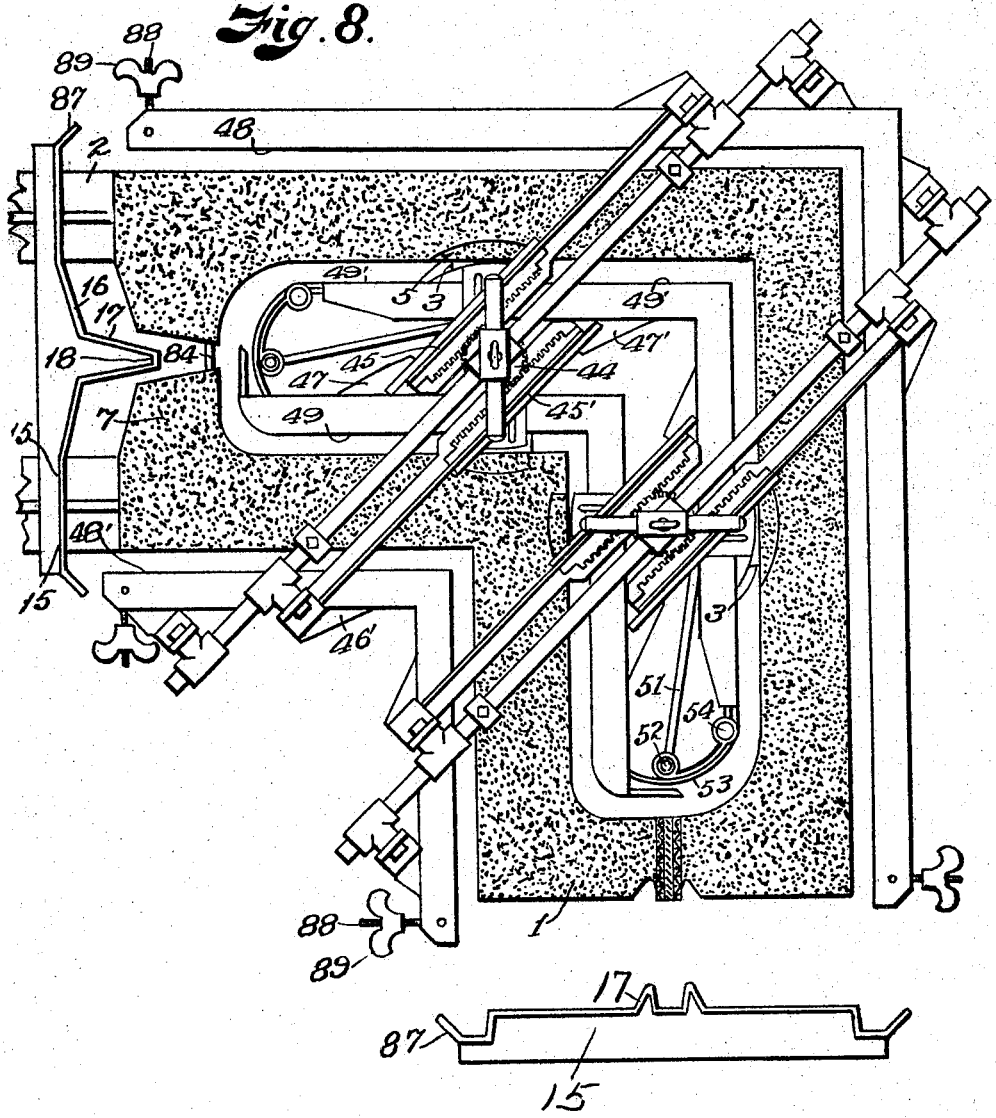

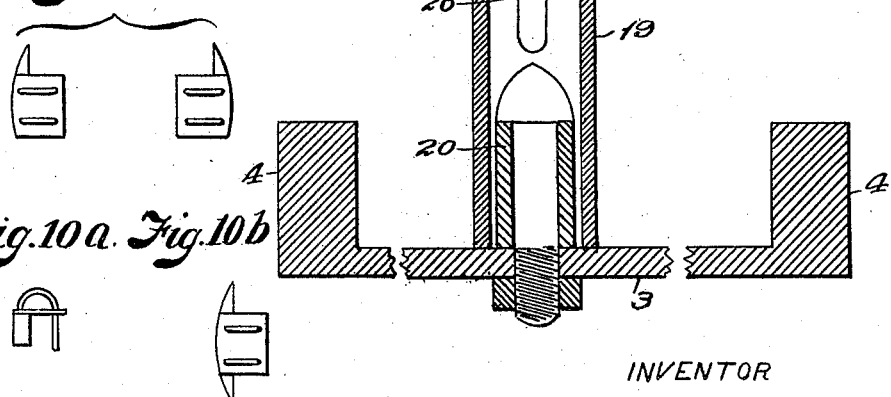

July 27, 1926.

H. A. LINTHWAITE

ART OF CONCRETE CONSTRUCTION

Filed Sept. 26, 1922    12 Sheets-Sheet 8

1,593,771

INVENTOR.
HERBERT A. LINTHWAITE.
BY James R. Townsend
ATTORNEY.

WITNESS
C. C. Holly.

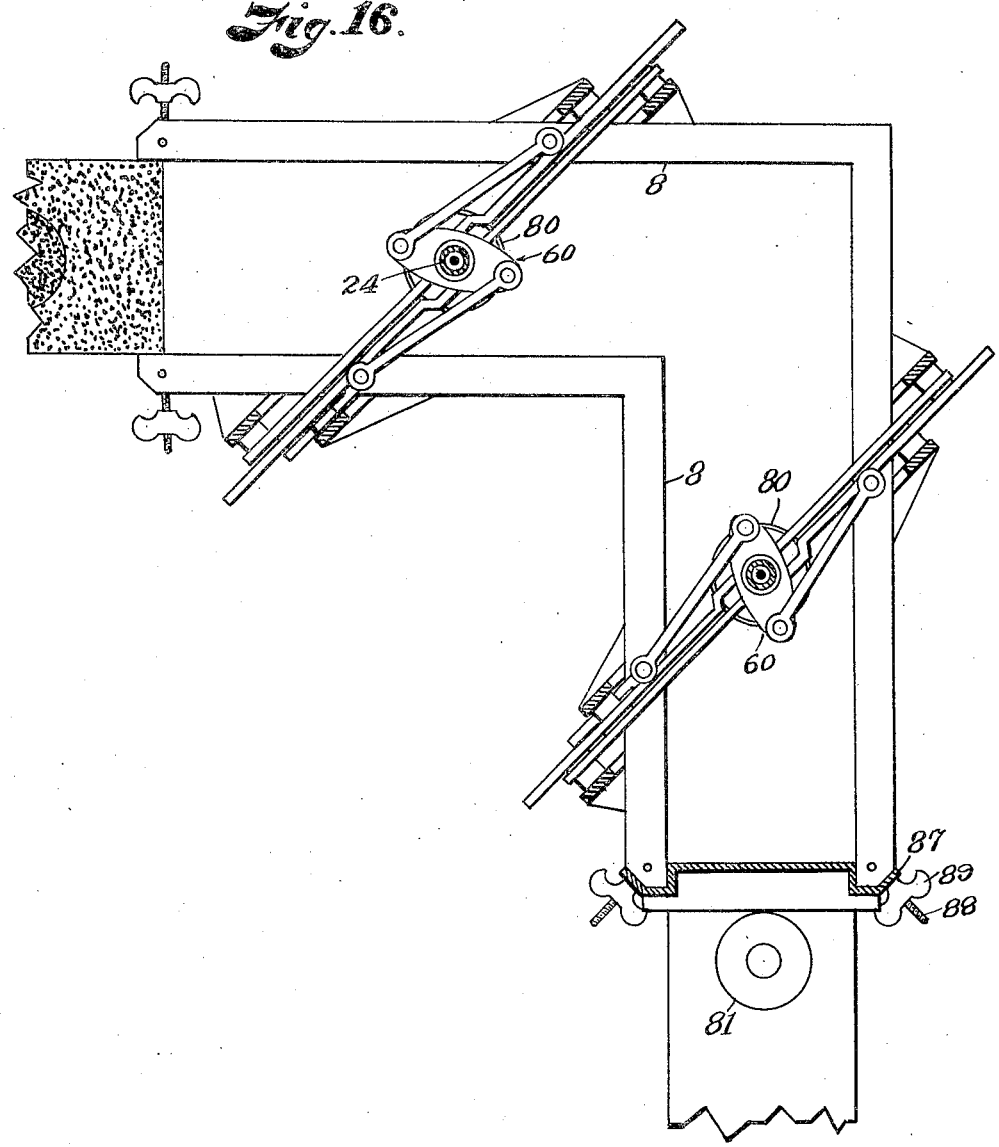

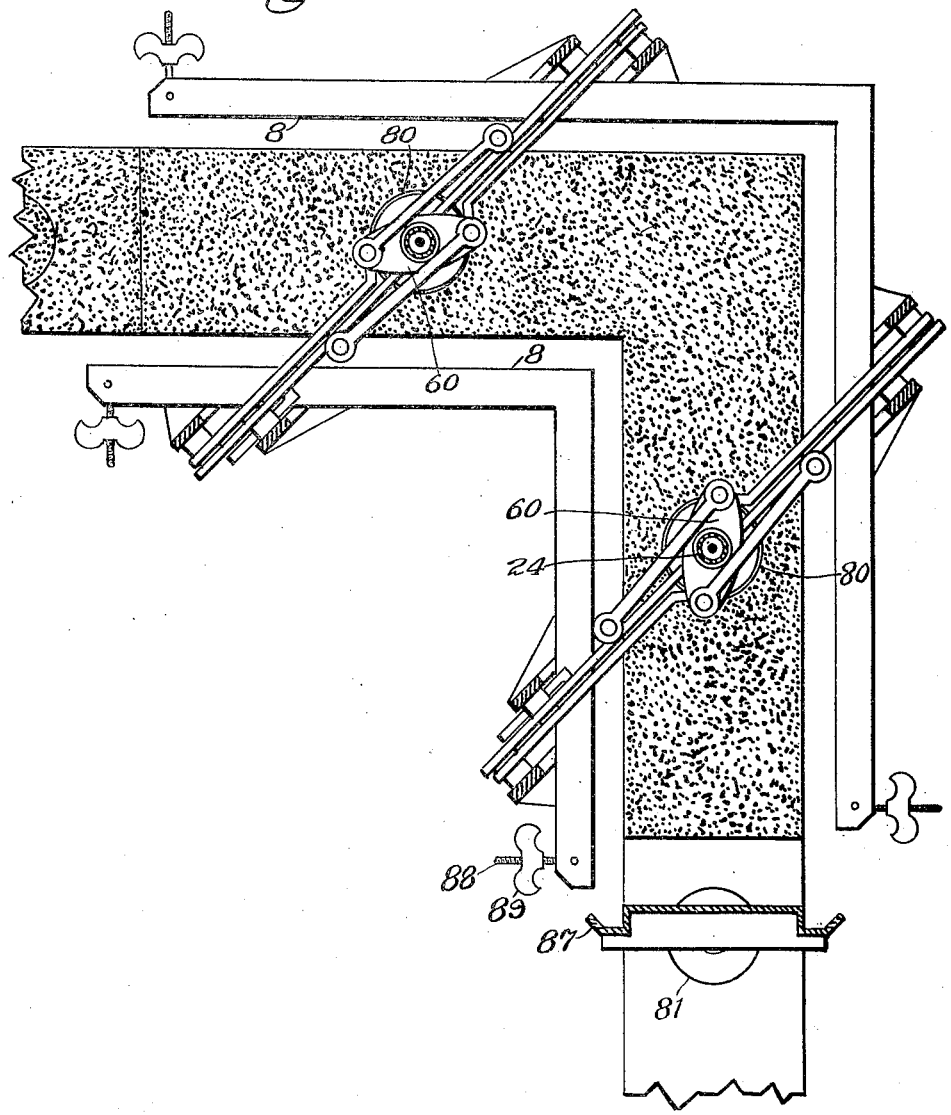

July 27, 1926.
H. A. LINTHWAITE
1,593,771
ART OF CONCRETE CONSTRUCTION
Filed Sept. 26, 1922   12 Sheets-Sheet 11
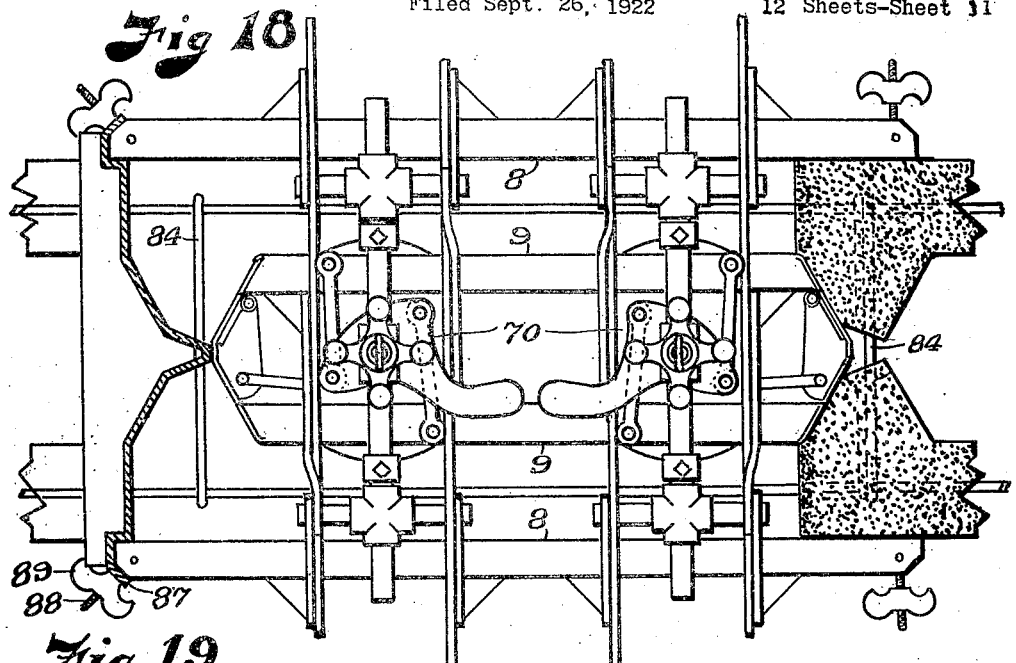
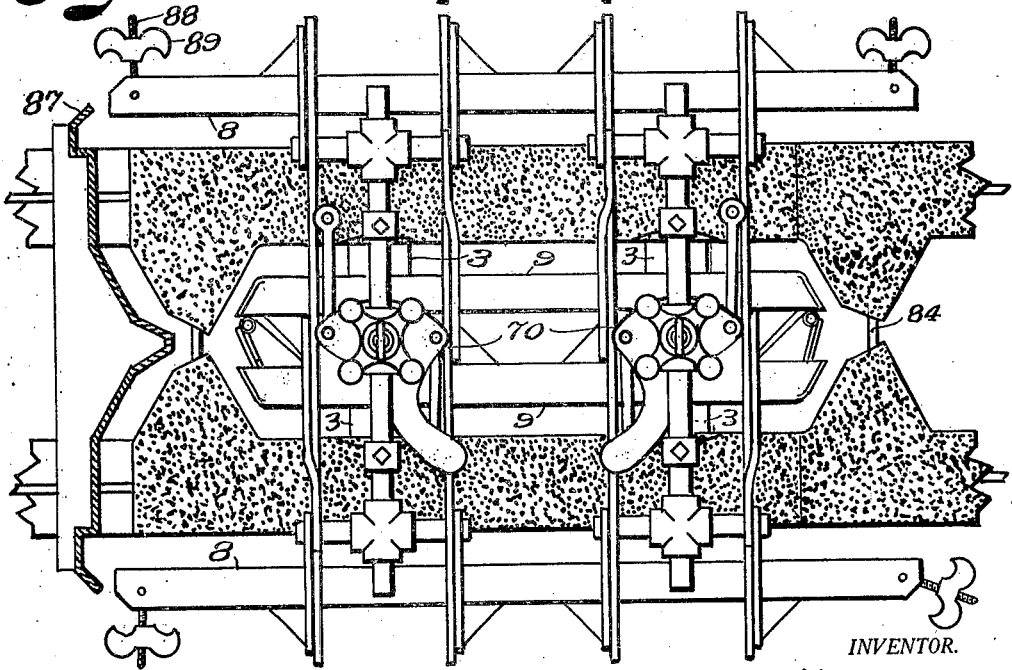
INVENTOR.
HERBERT A. LINTHWAITE.
WITNESS
C. C. Holly.
BY James R. Townsend
his ATTORNEY.

July 27, 1926.
H. A. LINTHWAITE
ART OF CONCRETE CONSTRUCTION
Filed Sept. 26, 1922    12 Sheets-Sheet 12
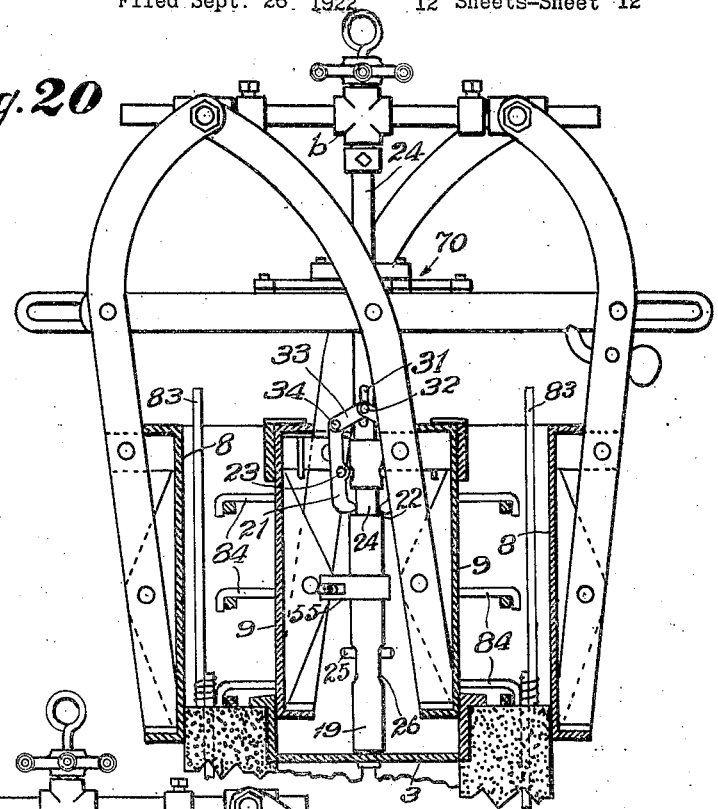
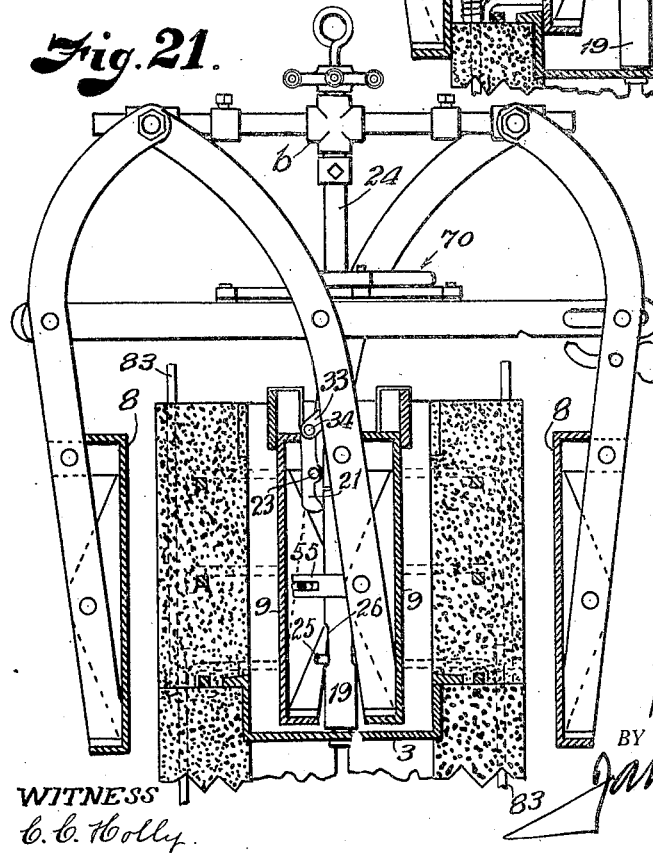
INVENTOR.
HERBERT A. LINTHWAITE.
BY James R. Townsend
his ATTORNEY.
WITNESS
C. C. Holly.

Patented July 27, 1926.

1,593,771

UNITED STATES PATENT OFFICE.

HERBERT A. LINTHWAITE, OF LOS ANGELES, CALIFORNIA.

ART OF CONCRETE CONSTRUCTION.

Application filed September 26, 1922. Serial No. 590,616.

This discovery and invention relates to the manufacture of concrete structures and includes an improved concrete structure and a method of and means for manufacturing the same.

Heretofore buildings, the walls of which are made of hydraulic cement concrete, have been subject to the objection that the external faces have been absorbent and have been rough in finish so that before a concrete building was practically completed it had to have the exterior surface painted or otherwise coated to counteract the roughness and porosity.

A further unsatisfactory condition with respect to such structures has prevailed from the cost of constructing and removing the forms between which the walls have heretofore been molded; and the necessity of leaving the forms in place until the material thereof has become hard; this being necessary on account of the tendency of the green concrete to crack and chip off at the edges and faces upon removal of the form or mold, and an object of this invention is to avoid that objection and to simplify the operation and minimize the time required in forming the concrete structure either with reinforced or non-reinforced concrete.

Heretofore air bonding and adhesion between the concrete and the mold have caused pitting and checking of the molded surface at removal of the mold; and especially is this true with respect to the top corners of molded walls of concrete material, and an object of this invention is to avoid checking, pitting and cracking of the corners of the surface, and yet allow the molds to be removed from the green concrete material.

I have discovered that the objections hereinbefore pointed out can be largely eliminated and a superior concrete structure be manufactured in place, if the structure is molded between troweling surfaces and, after the molded mass is sufficiently set to hold its shape, and while it is still moist, said troweling surfaces are moved to smooth the surface of the plastic molded material, the mold can be removed without causing any pitting of the surface, and that by moving said troweling surface downward, all danger of chipping off the corners is avoided and the adhesion and the air bonding between the structure and the mold will be practically eliminated, and the mold can then be removed from the face of the structure, and the freshly molded portion of the structure will remain intact from top to bottom.

This discovery and invention is broadly new, basic and pioneer in numerous respects; viz, provision is made whereby the troweling members or walls of the mold may be moved downward after the concrete has been poured or tamped and the surface thus trowelled for smoothing the molded portion of the structure, and means are provided whereby said troweling faces or members can be withdrawn horizontally from the molded material after such walls have been moved downward.

I have discovered that the smoothing effect and the breaking of the air bond and of the adhesion between the molded material and the faces of the mold need not be of any great amplitude and I have discovered that by supporting the mold on the top of a lower course while the pouring, tamping and smoothing of an upper course is being perfected, the work can be proceeded with at a much greater speed than heretofore possible.

This discovery and invention is applicable to the construction of both hollow channel concrete walls and solid concrete walls, and said walls can be constructed in any house or other building or structure where concrete walls plain or reinforced can be incorporated.

An object is to make a hollow wall of maximum strength for a given thickness and to provide for ready introduction of fireplaces, chimneys, doors, windows and other features, appliances and adjuncts.

An object of this invention is to provide compact, portable, practical, adaptable, useful forms, the use of which will permit of the rapid, sure, safe, cheap, clean, strong and scientific construction of concrete walls of either plain or reinforced, poured, or tamped molded concrete.

An object is to provide a fire proof, water proof, moisture proof, frost proof, vermin proof hollow channel wall construction with air space between outer and inner walls, and also to provide for the construction of solid continuous walls without air space.

An object is to provide forms that are new, practical, adaptable, useful and complete in their office and adaption, and that are really portable, and that are so constructed that they can be readily lifted, moved, adjusted, controlled, placed in position and removed from the wall by manual labor.

The discovery and invention includes the method and manner of supporting the forms on the wall and the method and manner of controlling the operations of the forms in their movement downward and outward, freeing the face of the forms from contact with the face of the concrete without distorting, disturbing or disfiguring the face of the concrete contained therein.

An object is to cheaply and rapidly construct a wall that will present a clean smooth perfect surface on the outside of the outside wall, and on the inside of the inside wall, and on both sides of the air space, or on either side of the solid wall.

The invention includes a corner form and the operation thereof is adaptable to the control of a corner form for hollow channel wall or for solid wall construction.

An object is to provide forms that can be adjusted to make any desired thickness of concrete wall, also give any desired breadth to air space in the hollow channel sections.

A principle of the invention is that by ramming the concrete in the forms, thoroughly filling all voids thereby, and then sliding the form downward, then opening outward straight-away from the face of the concrete, the action of the movement downward is in direct line with the gravity compression of the concrete, and that this downward motion of the form does not tend to disrupt or displace any part of the gravity molded concrete, and that by the simultaneous motion of the faces of the form moving straight-away clear of the concrete, there is left a perfectly true and smooth concrete wall which is clean, hard and solid in every respect. The control of the forms may be effected in various ways as by the use of gear wheels and tracks, also with the use of eccentric, also a cam control.

It is desirable in concrete construction that the forms shall be removed from the molded structure as soon as possible so that the forms may be released for re-use; and it is necessary to avoid any jars in such removal, because with green concrete, the slightest jar is likely to cause internal as well as surface ruptures and consequent weakening of the wall. Such ruptures will not knit together and they necessitate tearing down and recasting the ruptured portions.

With poured concrete it is necessary to keep the forms on the structure for a period greater than with tamped concrete; but I have discovered that by removing the forms from either tamped or poured concrete walls and wetting the surface, the hardening of the surface and the crystallization and solidifying of the wall is more quickly and preferably effected than where the forms are left on after sufficient setting of the concrete has occurred.

An object of this invention is to enable the constructor to get early inspection and to secure perfect surface crystallization.

Another object is to make the walls practically sound proof.

Other objects, advantages and features of invention may appear from the accompanying drawings, the subjoined detail description and the appended claims.

The accompanying drawings illustrate the invention.

Figure 1 is a plan view mainly in section on line $x^1$—$x^1$, Fig. 6 showing a form of one construction supported on a foundation and ready to receive concrete. Reinforcement, and a molded concrete section are also shown in place. Broken lines indicate some of the parts cut off by said section line.

Fig. 2 is a plan partly in section on irregular line $x^2$—$x^2$, Fig. 6, showing a form on a wall that is in course of construction; the form being opened from a green concrete block, with end gate withdrawn, the form released and lowered, the control opened, the sides of the form moved away clear from contact with the concrete, and the channel section with continuous air space, and reinforcement covered up; the form being ready to be lifted clear of the wall.

Fig. 3 is a cross section on line $x^3$, Fig. 1, showing the form set ready to receive the concrete, and the bridge having centering point and set in the die-made recesses, in the course below the form; also showing the steel rod of the reinforcement hooked over the two rods running through the course of the wall; also showing on the top of the form on the inside face of the wall, the die which is for making the recess for the support of the bridge for the next course of the wall.

Fig. 3ª is a fragmental perspective view of a wall corner constructed in accordance with this new method.

Fig. 4 is a cross section of the form lowered and opened from a molded section of concrete wall and ready to be lifted clear away from such concrete wall and set ahead to be refilled.

Fig. 4ª is a fragmental perspective of the wall construction between door and window openings.

Fig. 5 is an outside elevation of the form shown in previous views; the same being in place on a partly constructed wall.

Fig. 6 is a vertical longitudinal section on line $x^6$, Fig. 2, with some of the central parts intact.

Fig. 8 is a view of the form shown in Fig. 7 opened after trowelling operation on a tamped concrete corner block, and ready for removal from a corner of the wall, which is shown in place. The end plates are shown detached.

Fig. 9 is a plan illustrating one of the right hand bridges, having one end adapted for removal from the wall by a turn in one direction only.

Fig. 9$^a$ is a side elevation of the bridge shown in Fig. 9.

Fig. 9$^b$ is a plan of a left hand bridge complementary to the bridge shown in Figs. 9, 9$^a$.

Fig. 10 is an end view of the right and left dies, which may be used to form the recesses to receive the ends of bridges adapted to turn in one direction only.

Fig. 10$^a$ is a side view of one of the dies shown in Fig. 10.

Fig. 10$^b$ is a die adapted to make a recess to allow the bridge to be released by a turn either to the right or to the left.

Fig. 11 is an enlarged fragmental sectional detail of the dropping device for dropping and raising the trowelling faces.

Figure 12:
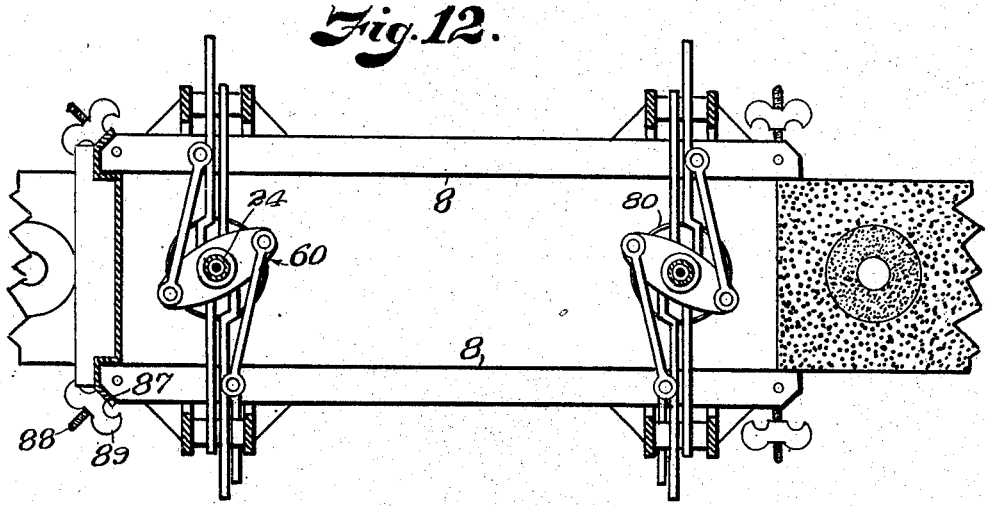

Fig. 12 is a plan of a form for molding a practically solid concrete wall, a fragment of which is shown. The form is shown set in position to receive a concrete charge.

Figure 13:
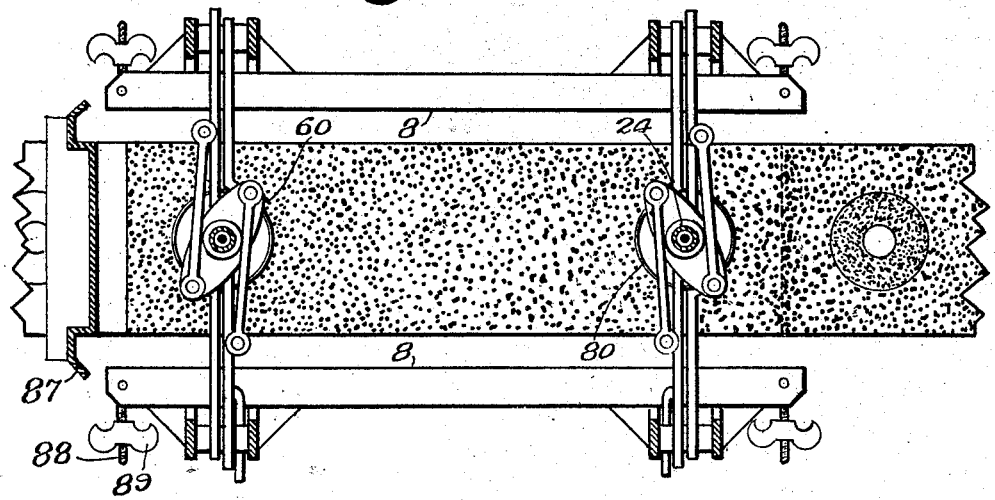

Fig. 13 is a plan of the form shown in Fig. 12, the parts being open and ready for lifting from the concrete section just completed.

Figure 14:
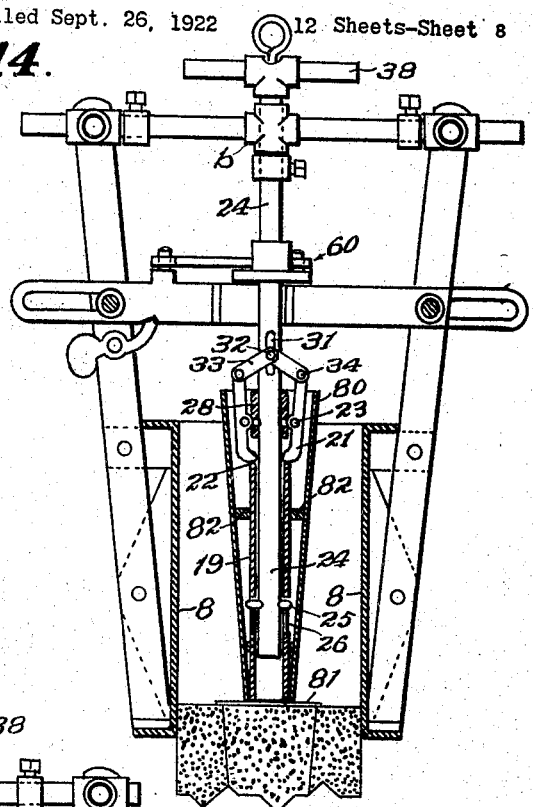

Fig. 14 is a cross section through the form shown in Fig. 12 in place. The same dropping device for a solid wall is here shown in transverse section.

Figure 15:
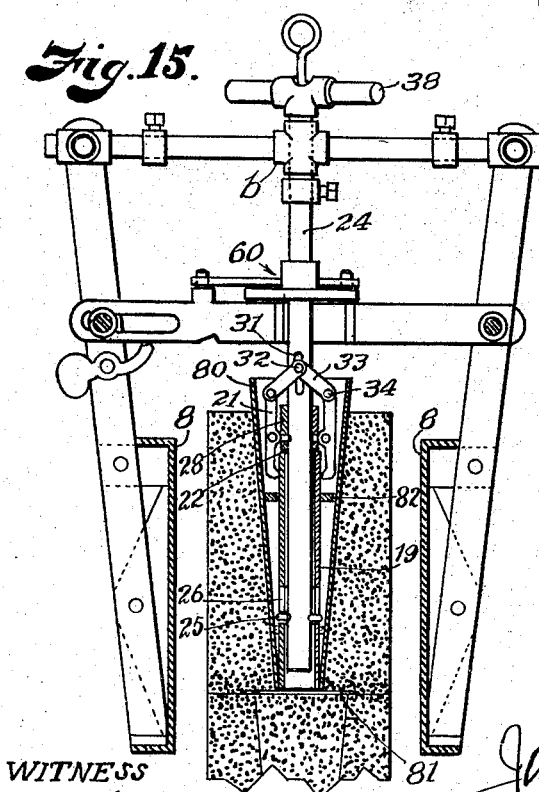

Fig. 15 is a view analogous to Fig. 14 showing the form expanded.

Fig. 16 is a plan of a solid corner form in place on a wall.

Fig. 17 is a view of the form shown in Fig. 16, the form being open to release the wall, a portion of which is shown finished.

Fig. 18 is a plan of another construction of straightaway form, fragments of the wall are shown.

Fig. 19 is a view analogous to Fig. 18, showing the same form as Fig. 18, released.

Fig. 20 is an elevation transverse to the wall showing a modified construction of the form which is shown closed on fragments of a hollow wall.

Fig. 21 is a view analogous to Fig. 20 showing the form open.

The green or freshly tamped concrete blocks 1 of the wall are mounted upon a suitable support which in Figs. 3 and 4 consists of the firmly set concrete blocks 2. The mold is supported by means such as the bridges 3 having arcuate ends 4 seated in recesses 5 formed in the concrete during the process of molding the blocks.

In the form shown in Figs. 1, 2, 3 and 4 the mold is adapted to the construction of a hollow internal pilastered wall formed of parallel stacks of concrete blocks 2; the inner faces of said stacks being channeled; the channels 6 being formed by the recesses between the pilasters 7.

The mold for each stack comprises a member having a flat outer trowelling face 8 and a member having an inner trowelling face 9 mainly parallel thereto and having a flat intermediate portion and a deflection 10 therefrom adapted to form parts of the pilaster faces 11.

The trowelling faces for the outer and inner wall faces on one side of the hollow wall, are distinguished from those for the outer and inner wall faces on the other side of the wall, by means of an exponent; the trowelling faces or walls for the outside of one stack being marked 8, and that for the inner side of the opposite stack being marked 9; which like face for the other outside and inside wall are marked 8', 9'. The same is true with respect to the parts marked 10, 10'. Likewise the faces marked 8', 9', 10' and 11' are connected for simultaneous lateral movement.

An adjustable end gate 12 is provided to extend across the space between the two inner walls 9, 9' of the form, at the end thereof, and these are adapted by slot and pin means 13, 14 to contraction of the core of the form, such core being thus practically constructed of the trowelling faces 9, 10 which are adapted to form the inside faces of the concrete blocks 1 as they are tamped to the mold which the form constitutes.

The end of the form comprises a plate having vertical faces 15, 16, 17 and 18; said faces 15 being alined with each other transversely of the mold and the faces 16, 17 being deflected inwardly and the face 18 being a connection between the ends of the inward deflections 17; and such ends of the form are adapted to form the forward ends of the blocks 1 against which are molded the rearward ends of the blocks where they become set blocks as at 2.

The trowelling face members 8, 9 are supported on the bridges 3 by means of hollow center posts 19 which are centered by means of studs 20 at the center of the bridges 3, and support said trowelling faces through the medium of the dogs 21 adapted to rest on shoulders 22 formed at the top of the post 19. Said dogs 21 are pivoted by pivots 23 to the reciprocating post 24 that is adapted by the pin and slot means 25, 26 to move up and down relative to the stationary bridges 3.

The pivots 23 are supported by eye bolts 27 screwed through reinforcements 28 into the reciprocating posts 24; and the dogs are held in the shoulder engaging position shown in Fig. 11, by springs 29 on pins 30 that extend through the reinforcements 28 and the reciprocating posts 24.

Said posts 24 are provided with slots 31 which accommodate transverse pins 32 that are connected by links 33 and pivots 34 with the upper ends of the dogs 21; said links 33 are arranged to slant upwardly from the pivots 34 to the pins 32 when the dogs 21 are at rest on the shoulders 22; and said pins 32 are operable by handles 35 so that by pulling up on the handles the dogs 21 are drawn apart at the lower end thus allowing the posts 24 to be lowered.

Said posts 24 are connected to guides 36, 36' which are rigidly connected respectively to the trowelling faces 8, 8' and 9, 9' and also to the adjustable end gates 12 through the standards 43 and 43'.

Said end gates are connected to the inner trowelling faces 9 by vertical rods 14 passing through said inner trowelling faces 9 and the slots 13 in the heads of the end gates.

Raising and lowering the trowelling face members 8 and 9 is effected by first pulling up on the handle 35, thus releasing the dogs 21; and thereupon the trowelling faces will slide downward over the concrete which has been tamped into place while the forms are set as shown in Fig. 3, thus trowelling such faces.

It is necessary that the trowelling faces 8 and 9 shall be movable laterally simultaneously; the outer faces 8 moving outwardly away from and the inner faces inwardly toward the vertical mid-plane of the wall in order to release the form from the green concrete.

I have provided central gears 37 fixed to the reciprocating posts 24 and rotatable by means of the handles 38 and I have provided connections between the outer trowelling face 8 on one side and the inner trowelling face 9 on the other side and have likewise connected together the trowelling faces 8' and 9', so that movement of the connected faces 8 and 9 and the connected faces 8' and 9', must be simultaneous in one or the other horizontal direction at right angles to the trowelling faces. Such connections are shown as including bars 39, 39'; and said gears 37 engage the racks 40, 40' of said bars upon opposite sides of said gears, respectively to simultaneously spread apart the outer trowelling faces 8, 8' and to move toward each other the inner trowelling faces 9, 9'.

The rack bars 39 are fixed by brackets 41 to the outer trowelling face 8 and extend across and free from the adjacent inner trowelling face 9' and are fixed to the farther inner trowelling face 9. The standards 43 form a connection by which the outer trowelling face 8 is fixed to said rack bar 39.

The rack bar 39' is connected by standards 43' to the other outer trowelling face 8' and extends across the adjacent inner trowelling face 9 and is fixed to the opposite trowelling face 9'. The standards 43 and 43' are slidably on the guides 36 and 36' which guide is vertically movable on the post 24 by means of the cross $b$ so that when the operator raises the handle 38 the post 24 may be drawn up; and by drawing up the handle 35, the dogs 21 will be released from the supports 19; and by revolving the handle 38 each trowelling face will be moved out of contact with the wall which has been molded thereagainst.

Figure 7:
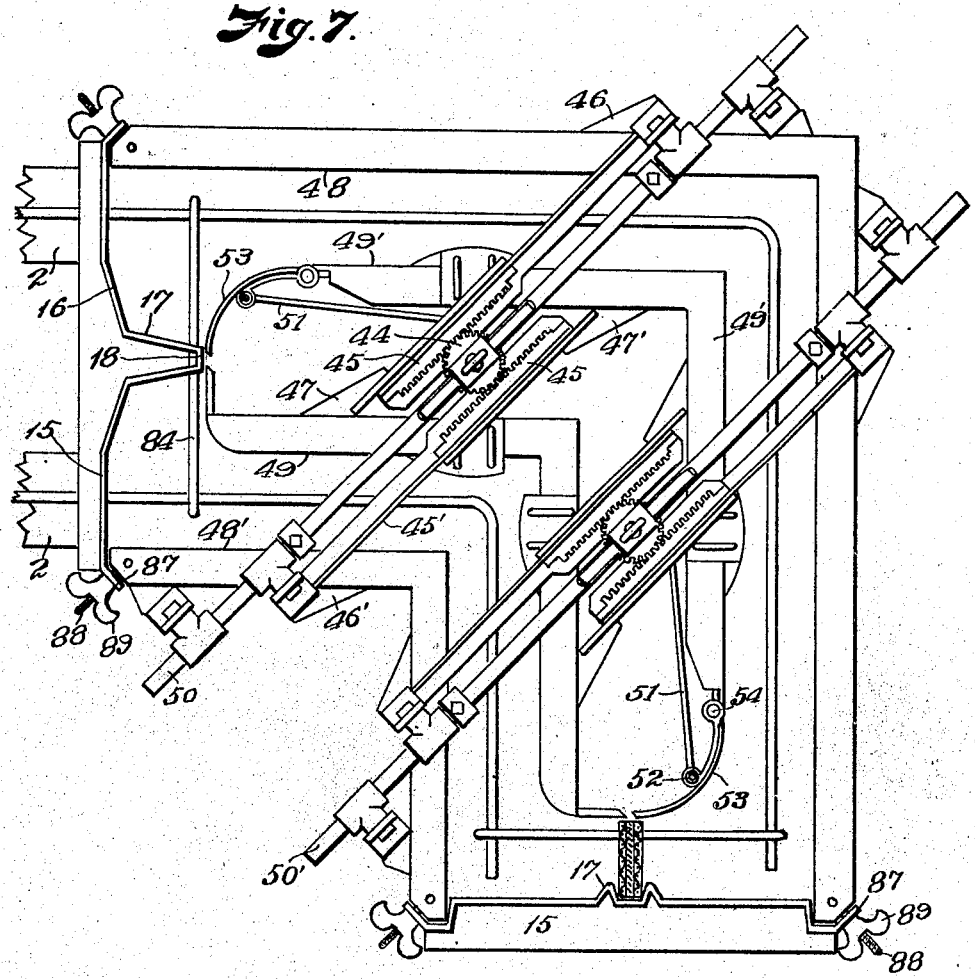
Fig. 7 is a plan of a corner form in place ready to receive the concrete.

Referring now to the form shown in Fig. 7 for corner construction, the central gear 44 is arranged to mesh with the rack bars 45 which are fixed by suitable means as the brackets 46, 47 to the outermost corner trowelling face 48 and the innermost inside trowelling face 49; and the diagonal rack bar 45' is fastened by the brackets 46' and 47' to the innermost corner trowelling face 48' and to the outermost inside trowelling face 49'.

51 is a rod pivoted at 52 to the inside hinge end gate 53 hinged to the angling side walls 49' at 54 operated through bracket 55 which is pivoted by the pin 56.

The rod 51 may be fastened in any suitable way as by hooking over removable pin 56 and bracket 55; by releasing the latch 51, the end gate 53 may be swung in when necessary.

In Figs. 12, 13, 14, 15, 16 and 17 the walls are operated by a suitable eccentric device 60. In Figs. 18, 19, 20 and 21 a cam arrangement 70 is shown to serve the same purpose.

In the form shown in Figs. 12, 13, 14, 15, 16 and 17 a conical core 80 supported on the metal disk 81 is fixed by a brace 82 to the hollow center post 19.

The conical core 80 is fastened to a hollow post 19 by suitable brackets 82 resting on the metal disk 81 until the completion of the filling of the form. The trowelling faces are removed from contact of the concrete by the turning the handle 38 and turning cone 80, thus freeing the molding means from contact with the concrete.

The operation of manufacturing walls of a building in accordance with this discovery and invention is apparent from the foregoing. When the wall footings 2$^a$ have been first constructed in the usual manner, the corner form shown in Fig. 7 is set, and the concrete is cast therein; this operation is repeated at all corners and angles of the wall.

The forms shown in Figs. 1 and 2 are then placed, joining to the section cast by corner form such as is shown in Fig. 7; and said form filled with concrete. The operation of placing and filling forms shown in Fig. 1 is continued around the course of the wall between the corners previously constructed, and with forms of various lengths to accommodate the architectural design.

Upon completion of the cast of the first course, the corner forms as shown in Figs. 7 and 8 are placed on top of the corner sections previously cast and new casts are made.

The concrete cast in the second course knits with and adheres to the lower course thus making a monolithic bond.

The process is repeated for each course, using the various forms not shown, constructed to carry out the architectural design, and the process is repeated to the completion of the wall leaving the wall a monolithic structure smooth and perfect at the completion of the wall structure itself.

Upright and transverse reinforcing steel rods 83, 84 are placed in the molds as shown in Fig. 3 and the cross rods 84 are supported, in the slots 18′ of the section of end gate 18′ shown in Fig. 6. These cross rods supported in said slots in the end gate, are wired to the upright rods 83 shown in Fig. 3; thus being held in place while the filling and tamping of the concrete is accomplished; and remaining in position after the end gate 18 shown in Fig. 6 is removed.

Preferably this reinforcement occurs in each pilaster throughout the wall structure; and by this means of reinforcing, both walls are tied together across the air space with metal or other suitable ties.

This reinforcement is begun at the first course above the footing and is carried through each pilaster to the final course of the wall at the top of the building; thus tying both walls securely to each other by steel or other suitable reinforcement in every pilaster in the wall structure.

It is thus seen that I have constructed a wall of concrete blocks having a uniform trowelled surface, said surface extending from bottom to top of the wall. By trowelled surface I mean a surface that is condensed and smoothed as by the rubbing of a trowel upon a freshly molded and measurably plastic cementitious body whereby the trowelled surface is made denser and smoother than is possible without such movement of the trowelling device while the body is plastic but while it has sufficient set to remain upright when the trowelling device is withdrawn from the smooth surface.

In Fig. 4ª two short hollow walls united by the transverse reinforcement 84 are shown as forming a pillar between the window framing 85 and the door framing 86. Such framing may be of wood, metal or any other suitable material.

It is understood that the detachable end pieces 15 with their deflections may be of any suitable form desired and they are shown in the drawings as being provided with end lugs 87, with which clamps, as the swinging bolts 88 provided with wing nuts 89 are arranged to engage when the end piece is adjusted to close the end of the mold.

The wall molding means comprising a corner mold and straight molds as shown in the drawings. These are correspondingly adjustable so that the wall may be molded and trowelled alike throughout.

I claim.

1. The method of wall building set forth, which comprises establishing one or more plastic concrete blocks upon a suitable support between trowelling faces, moving said trowelling faces to trowel the block surfaces and then moving the trowelling faces from the thus trowelled surfaces.

2. The method of wall building set forth, which comprises establishing one or more plastic concrete blocks upon a suitable support between trowelling faces, moving said trowelling faces downward to trowel the block surfaces in the direction of the force of gravity, and then moving the trowelling faces from the trowelled surfaces.

3. The method of wall building set forth, which comprises placing metal reinforcement upon a suitable support and establishing a plastic concrete block on said support and reinforcement, and between trowelling faces; then moving said trowelling faces downward to trowel the block surfaces, and then moving the trowelling faces away from the trowelled surfaces.

4. The method set forth of constructing a wall, which comprises placing metal reinforcement upon a suitable support and establishing plastic concrete upon said support and reinforcement, and between trowelling faces; then moving the trowelling faces to trowel the concrete surfaces, and then moving said trowelling faces straight away from the trowelled concrete surfaces.

5. The method set forth of constructing a wall, which comprises establishing parallel blocks of plastic concrete upon a suitable support between parallel trowelling faces arranged in pairs, then moving the trowelling faces to trowel the plastic concrete; and then moving said trowelling faces away from their respective trowelled surfaces.

6. The method set forth of constructing a wall, which comprises establishing parallel blocks of plastic concrete upon suitable supporting and reinforcing means between parallel trowelling faces arranged in pairs; then moving the trowelling faces to trowel the plastic concrete; and then moving said trowelling faces away from their respective trowelled surfaces.

7. The method set forth of constructing a wall, which comprises establishing parallel blocks of plastic concrete upon suitable supporting means between parallel trowelling faces arranged in pairs, and inserting reinforcing ties in the plastic concrete to tie the blocks together, and moving the trowelling faces downwardly to trowel the surfaces of the blocks before the concrete is set.

8. The method set forth of constructing a wall which comprises establishing parallel blocks of plastic concrete upon suitable supporting and reinforcing means between parallel trowelling faces arranged in pairs; forming oppositely arranged arcuate imprints in the tops of the blocks of each pair; moving the trowelling faces to trowel the surfaces of the plastic blocks; moving the trowelling faces away from the trowelled surfaces; elevating the trowelling faces above the level of the blocks; establishing a support having arcuate ends in the imprints; supporting the trowelling faces upon said support; returning the trowelling faces to position to serve as molds, and applying reinforcement on the molded blocks; adjusting the trowelling faces to position for molding concrete blocks on the reinforcement and the molded blocks, and moving the trowelling faces to trowel the surfaces of the plastic blocks between the trowelling faces, and then moving the trowelling faces away from the trowelled surfaces.

9. A mold comprising a flat trowelling face; a trowelling face arranged facing the flat trowelling face and provided with pilaster forming deflections extending away from the flat trowelling face; means to hold said trowelling faces in practical parallelism and means for moving said trowelling faces to trowel the surfaces of the block molded between said trowelling faces and means to give a separating movement simultaneous to said trowelling faces.

10. A mold comprising parallel faces and a plate at one end of said parallel faces, said plate having two alined vertical faces; faces forming inward deflections from said alined faces; and a face forming a connection between the deflections, the plates being removable from the parallel faces and adapted to be connected to said parallel faces to form a mold for molding blocks having pilasters.

11. A mold comprising parallel faces one of which has deflections at its ends away from the other face; an end piece connected to and removable from the parallel faces to form a mold for molding a block having a pilaster; and means to move the parallel faces vertically and horizontally in succession.

12. A mold comprising two outside flat faces; two inside faces having flat portions in parallelism with the outer flat faces and having deflections for forming the faces of pilasters, an end piece having central deflections to connect the pilaster forming deflections of the inner faces; means for detachably connecting the end piece with the outer trowelling faces; means for moving the trowelling faces vertically; and means for moving the trowelling faces horizontal.

13. In combination, a mold having faces arranged in vertical parallelism and means to connect said faces; a support adapted to rest on a completed portion of a wall and to support the connected faces; means for lowering the faces; and means for moving the faces toward and from each other.

14. In combination with a mold comprising four trowelling faces and means to move said faces toward and from each other to adjust the mold to simultaneously mold two spaced blocks of a hollow concrete wall; a bridge to rest on two previously molded spaced blocks and to extend across the space between said mold blocks and to rest on said blocks; and means on said bridge to support said faces and allow them to be lowered and raised.

15. In combination with a mold of the character described; having four trowelling faces arranged in vertical parallelism with each other; means for supporting the mold and for allowing vertical and horizontal movement of the faces and a bridge to support said supporting means; said bridge being adapted to rest on top of previously molded blocks of a hollow wall, and having arcuate ends to allow the bridge to be revolved to remove the ends of the bridge from blocks molded on said ends and previously molded blocks.

16. Means for molding walls comprising a corner mold, provided with trowelling faces; means to support said mold on a foundation or a previously molded part of a wall, means to lower the mold to trowel freshly molded surfaces; and means to release the trowelling faces from the trowelled faces.

In testimony whereof, I have hereunto set my hand at Los Angeles, California, this 20th day of September, 1922.

HERBERT A. LINTHWAITE.